United States Patent [19]

Fischer

[11] 4,003,399
[45] Jan. 18, 1977

[54] ANTI-SYPHON DEVICE FOR A WATER SUPPLY LINE

[76] Inventor: Edward J. Fischer, 630 Queen City Ave., Crescent Springs, Ky. 41011

[22] Filed: Feb. 25, 1975

[21] Appl. No.: 552,934

[52] U.S. Cl. .............................. 137/592; 137/539; 4/196
[51] Int. Cl.² .................. F16K 15/04; E03D 11/00
[58] Field of Search .......... 137/218, 539, 215, 436, 137/444, 515.5, 592, 515, 540, 539.5, 533.11, 533.13, 533.15, 535, 216, 216.1; 4/18, 41, 196, 26

[56] References Cited

UNITED STATES PATENTS

| | | | |
|---|---|---|---|
| 1,764,186 | 6/1930 | Teesdale | 137/515.5 |
| 1,901,633 | 3/1933 | Glemmons | 137/436 |
| 2,737,199 | 3/1956 | Ingram | 137/515.3 X |
| 3,059,667 | 10/1962 | Coceano | 137/533.13 |
| 3,171,424 | 3/1965 | Shames et al. | 137/218 |
| 3,542,155 | 11/1970 | Kern et al. | 137/539 X |

Primary Examiner—William R. Cline
Attorney, Agent, or Firm—James W. Pearce; Roy F. Schaeperklaus

[57] ABSTRACT

An anti-syphon device for a water supply line of a toilet tank having an opening in a bottom wall thereof. A tubular inlet fitting is mounted in the opening and has a lower portion extending downwardly from the bottom wall. The water supply line underlies the inlet fitting and includes a main portion, a head portion of enlarged diameter, and an outwardly extending flange at an upper end of the head portion. A washer forms a seal between the flange of the water supply line and the lower portion of the inlet fitting. The washer includes a portion extending inwardly of the head portion. There is a valve seat at the lower end of the head portion and a valve member, which is inside the head portion, engages the valve seat to form a seal therewith. A compression spring bears on the valve member and on the inwardly extending portion of the washer member to urge the valve member to closed position.

4 Claims, 1 Drawing Figure

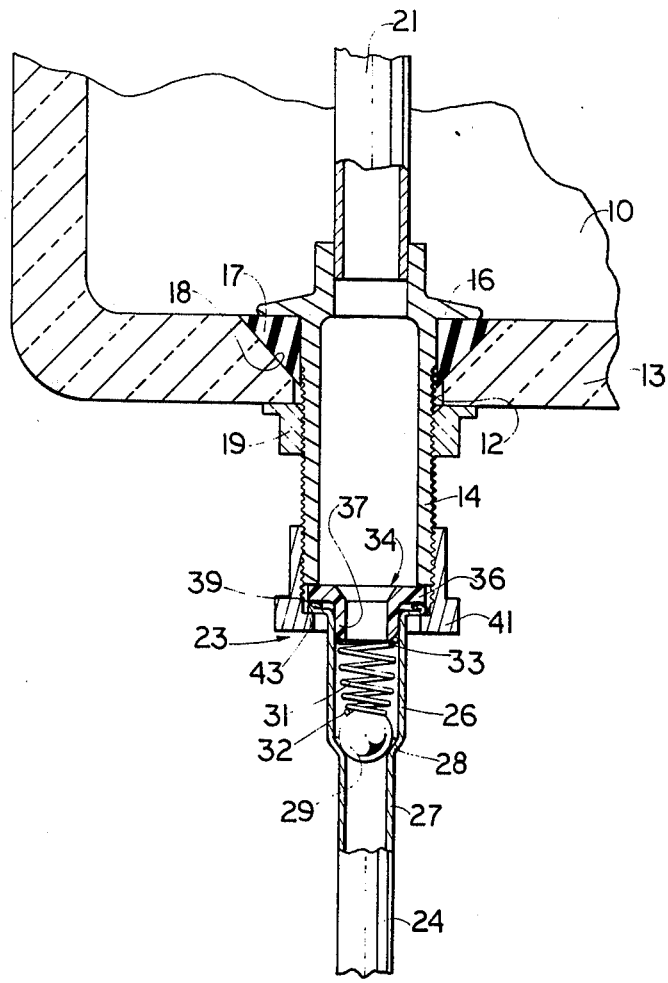

ANTI-SYPHON DEVICE FOR A WATER SUPPLY LINE

This invention relates to a water supply connection for a toilet reservoir. More particularly, this invention relates to an anti-syphoning means for a water supply connection.

An object of this invention is to provide a simple and positive check valve for a water supply line.

Briefly, this invention provides a water supply line for a toilet reservoir. The water supply line has an enlarged head portion in which a ball valve moves. The ball valve engages a valve seat formed at an intersection between a main portion of the water supply line and the enlarged head portion. The head portion of the water supply line is connected to a tubular mounting fixture which directs water from the water supply line into the interior of the toilet reservoir. A compression spring mounted inside the enlarged head portion urges the ball valve against the valve seat. The spring is supported by a washer member which is provided between the head portion of the water supply line and the mounting fixture. The spring can be a compression spring of conic shape having a large end which engages the washer and a small end which engages the ball valve.

The above and other objects and features of the invention will be apparent to those skilled in the art to which this invention pertains from the following detailed description and the drawing.

The drawing is a view in upright section showing an anti-syphoning device constructed in accordance with an embodiment of this invention, fragmentary portions of a toilet reservoir and of a water supply line being shown in association therewith.

In the following detailed description and the drawing, like reference characters indicate like parts.

In the drawing is shown a fragmentary portion of a toilet reservoir 10 having an opening 12 in a bottom wall 13 thereof. A tubular mounting fitting 14 is mounted in the opening 12 with an annular flange 16 of the fitting 14 overlying and engaging an annular washer 17. The washer 17 fits into a frusto-conic upper portion 18 of the opening 12 to form a seal between the fitting 14 and the bottom wall 13 of the reservoir 10. A nut 19 threaded on the fitting 14 holds the fitting 14 in position in the opening 12. A riser 21 is attached to the fitting 16, as by soldering, and conducts water upwardly therefrom to appropriate valve mechanism, not shown, which can be of the type shown in my U.S. Pat. No. 3,853,141.

On the lower end of the fitting 14 is mounted an anti-syphon assembly 23 constructed in accordance with an embodiment of this invention. The assembly 23 includes a water supply pipe 24 having an upper or head portion 26 of enlarged diameter which is connected to a main portion 27 thereof by a frusto-conic section 28. The frusto-conic section 28 forms a seat for a valve ball 29, which works in the head portion 26.

The valve ball 29 is urged downwardly against the seat 28 by a helical compression spring 31. The spring 31 is of frusto-conic shape with a lower end portion 32 of reduced diameter engaging the valve ball 29. An upper end portion 33 of the spring 31 engages an annular washer member 34. The washer member 34 includes an outwardly extending flange portion 36, which underlies a lower end of the fitting 14, and a tubular portion 37, which extends downwardly inside the head portion 26 of the water supply pipe 24. The lower end of the tubular portion 37 engages the upper end portion 33 of spring 31. An outwardly extending annular flange 39 at the upper end of the water supply pipe 24 underlies the flange portion 36 of the washer member 34. A nut 41 threaded on the fitting 14 includes an inwardly directed annular flange 43 which underlies the flange 39 so that the nut 41 holds the water inlet pipe 24 and the annular washer member 34 in assembled relation at the lower end of the fitting 14 with the flange 36 of the washer member 34 forming a seal between the water inlet pipe 24 and the fitting 14.

When water is supplied to the lower end of the water supply line 24, and the valve mechanism (not shown) at the upper end of the riser 21 opens to permit water to move upwardly in the riser 21, the pressure of water in the water supply line 24 causes the valve ball 29 to rise against the pressure of the spring 31 to permit water to pass the valve ball 29 and flow upwardly around the valve ball 29 and through the head portion 26 of the water supply pipe 24 to the fitting 14 to be conducted therethrough to the riser pipe 21. However, in the event of failure of pressure in the line 24, the valve ball 29 seats against the valve seat 28 and prevents downward flow of water from the riser 21 into the portion of the water supply pipe 24 below the valve seat 28. The spring 31 holds the valve ball 29 firmly against its seat 28 as long as water is not flowing upwardly.

The anti-syphon valve assembly structure illustrated in the drawing and described above is subject to structural modification without departing from the spirit and scope of the appended claims.

Having described my invention, what I claim as new and desire to secure by letters patent is:

1. In combination with a toilet tank having an opening in a bottom wall thereof, a tubular inlet fitting mounted in the opening and having a lower portion extending downwardly from the bottom wall, a one-piece water supply line underlying the inlet fitting, the water supply line including a main portion, a head portion of enlarged diameter, and an outwardly extending flange at an upper end of the head portion, a washer member forming a seal between the flange of the water supply line and the lower portion of the inlet fitting, the washer member having a portion extending inwardly of the head portion, a lower end section of the head portion of the water supply line extending downwardly and inwardly to the main portion of the water supply line to form a valve seat at the lower end of the head portion, a valve member inside the head portion engageable with the valve seat to form a seal therewith, a compression spring mounted in the head portion and bearing on the valve member and on the inwardly extending portion of the washer member to urge the valve member to closed position, and means mounted on the lower portion of the inlet fitting and bearing on the flange of the water supply line to hold the water supply line and the washer member in assembled relation on the lower portion of the inlet fitting.

2. A combination as in claim 1 wherein the means mounted on the lower portion of the inlet fitting and bearing on the flange of the water supply line is a nut threaded on the inlet fitting and having an inwardly directed flange engaging the flange of the water supply line.

3. A combination as in claim 1 wherein the spring is a helical spring of frusto-conic shape, the valve member is a valve ball, an end portion of the spring of reduced diameter engages the valve member, and an end portion of the spring of increased diameter engages the inwardly extending portion of the washer member.

4. In combination with a toilet tank having an opening in a bottom wall thereof, a tubular inlet fitting mounted in the opening and having a lower portion extending downwardly from the bottom wall, a one-piece water supply line underlying the inlet fitting, the water supply line including a main portion, a head portion of enlarged diameter, and an outwardly extending flange at an upper end of the head portion, a washer member forming a seal between the flange of the water supply line and the lower portion of the inlet fitting, a lower end section of the head portion of the water supply line extending downwardly and inwardly to the main portion of the water supply line to form a valve seat at the lower end of the head portion, a valve member inside the head portion engageable with the valve seat to form a seal therewith, a compression spring mounted in the head portion and bearing on the washer member and on the valve member to urge the valve member to closed position, and means mounted on the lower portion of the inlet fitting and bearing on the flange of the water supply line to hold the water supply line and the washer member in assembled relation on the lower portion of the inlet fitting.

* * * * *